United States Patent
Thomson et al.

(10) Patent No.: US 8,350,756 B2
(45) Date of Patent: Jan. 8, 2013

(54) DETECTING AND COMPENSATING FOR ERRONEOUS TIME MEASUREMENT FOR MOBILE DEVICE POSITION CALCULATION

(75) Inventors: Martin Wyville Thomson, Keiraville (AU); Neil Lindsay Harper, Mangerton (AU)

(73) Assignee: Andrew LLC, Hickory, NC (US)

( * ) Notice: Subject to any disclaimer, the term of this patent is extended or adjusted under 35 U.S.C. 154(b) by 290 days.

(21) Appl. No.: 12/815,640

(22) Filed: Jun. 15, 2010

(65) Prior Publication Data

US 2011/0169691 A1 Jul. 14, 2011

Related U.S. Application Data

(60) Provisional application No. 61/294,344, filed on Jan. 12, 2010.

(51) Int. Cl.
G01S 19/09 (2010.01)
G01S 19/06 (2010.01)
G01S 19/25 (2010.01)

(52) U.S. Cl. .......... 342/357.46; 342/357.43; 342/357.64

(58) Field of Classification Search ............. 342/357.25, 342/357.42, 357.43, 357.46, 357.64; 701/469, 701/473
See application file for complete search history.

(56) References Cited

U.S. PATENT DOCUMENTS

| 7,554,487 | B2 | 6/2009 | Abraham et al. |
| 2006/0234724 | A1 | 10/2006 | Syrjarinne et al. |
| 2008/0180318 | A1 | 7/2008 | Glennon et al. |

OTHER PUBLICATIONS

N. Harper, "A Comparison of Iterative and Integrated Time Recovery Methods for Server Side Position Calculation," IGNSS Symposium, Dec. 2007, 9 pages.
E. Glennon et al. "Solution of Timing Errors in AGPS," Institute of Navigation (ION) GPS 2005, Sep. 2005, 6 pgs.
J. Syrjarinne, "Possibilities for GPS Time Recovery with GSM Network Assistance," ION GPS 2000, Sep. 2000, pp. 955-966.

Primary Examiner — Dao Phan
(74) Attorney, Agent, or Firm — Volentine & Whitt, PLLC

(57) ABSTRACT

A method implemented by an assisted Global Navigation Satellite System (GNSS) server determines a position of a GNSS receiver. The method includes sending a request for measurement information to the GNSS receiver at a first time and receiving the measurement information from the GNSS receiver in response to the request at a second time, where the measurement information includes position measurement data and a corresponding measured time based on satellite signals received by the GNSS receiver. The measured time is determined to be erroneous when it is outside an accurate time range determined based on at least one of the first time and the second time. A substitute time is identified and the position of the GNSS receiver is determined based on the substitute time when the measured time is erroneous.

20 Claims, 5 Drawing Sheets

US 8,350,756 B2

DETECTING AND COMPENSATING FOR ERRONEOUS TIME MEASUREMENT FOR MOBILE DEVICE POSITION CALCULATION

PRIORITY STATEMENT

This application claims priority from provisional patent application No. 61/294,344, filed Jan. 12, 2010, in the United States Patent and Trademark Office, the disclosure of which is hereby incorporated by reference in its entirety.

BACKGROUND AND SUMMARY

Wireless communication networks include base stations for exchanging communications with mobile devices operating within corresponding cells. The base stations are connected to a controller, such as a base station controller (BSC) in a Global System for Mobile communication (GSM) network or a radio network controller (RNC) in a Universal Mobile Telecommunication System (UMTS) network, which in turn are connected to a Mobile Switching Center (MSC) within a core network.

Many conventional wireless communication services implemented by the wireless communication networks include the feature of determining geographic locations mobile devices. For example, an emergency service responsive to "911" initiated at a mobile device may include estimating latitude and longitude of the mobile device in order to locate the mobile device. Likewise, a value-added service may identify the nearest retail outlet of a particular store based on the current estimated position of the mobile device. The geographic location of a mobile device may be determined by a mobile location center (MLC) server or node in the wireless communication network, such as a serving mobile location center (SMLC) in a GSM network or a standalone SMLC (SAS) in a UMTS network, for example.

The MLC may determine the geographic location of a mobile device using positioning measurements from a global navigation satellite system (GNSS), which are provided by a GNSS receiver in the mobile device. Accurate time is needed for accurate position determination using GNSS positioning measurements. The position calculation models are only valid for a short period of time, and thus a large error in time results in large errors in calculations. When the GNSS receiver is unable to receive the satellite signals and/or to demodulate the timing information, assisted GNSS (A-GNSS) may be utilized to provide reference time data, as well as acquisition assistance, to the mobile device.

In a server-based A-GNSS configuration, for example, the MLC implements a position calculation function using variations on an iterative weighted least squares algorithm, which may operate in two modes. The first mode may be implemented when the time at which the GNSS receiver performs satellite signal measurements is known to a high degree of accuracy, in which case the calculations can be limited to the geographic position of the mobile device. In three dimensions, this means that four measurements (e.g., from four satellites in the GNSS constellation) are required to solve for the x, y and z coordinates of the mobile device, as well as the sub-millisecond handset clock drift or receiver clock error $\mu$. The first mode produces a high yield, providing that accurate time is provided by the mobile device, and is able to compensate for small errors in measured time, such as errors that result from receiver clock drift. Larger errors in time cannot be corrected so easily, and thus directly increase position errors and reduce yield.

The second mode is implemented when the time is unavailable or not accurate, in which case the calculations include an additional measurement (e.g., from a fifth satellite in the GNSS constellation), which is required to determine or recover the gross time error. The fifth measurement is required to include measurement time T as a fifth variable, in addition to the x, y, z coordinates and receiver clock error $\mu$. Thus, in a server-based A-GNSS system, the MLC is able recover the measurement time.

Because of the distributed nature of A-GNSS systems, timing errors in one portion of the system do not affect the operation of the GNSS receiver. In server-based A-GNSS, for example, the mobile device does not use the measurement time, and is therefore capable of functioning without accurate time provided that the server provides correct assistance data. However, for the MLC to calculate the position of the mobile device, the measurement time must be accurate. Otherwise, errors in measurement time result in inaccurate position determination of the mobile device, even where other measurement data is good. Also, even when the MLC is capable of recovering an accurate measurement time from an inaccurate input, an approximate time accurate within a certain window is necessary to initiate the process. A measured time may be provided from the mobile device, but the measured time may be erroneous (i.e., outside the window of usable initial times), in which case the MLC is still unable to recover an accurate measurement time. Further, when the MLC is not aware that the measured time received form the mobile device is erroneous, it will not take steps to substitute an alternate initial time.

In a representative embodiment, a method implemented by an A-GNSS server is provided for determining a position of a GNSS receiver. The method includes sending a request for measurement information to the GNSS receiver at a first time, and receiving the measurement information from the GNSS receiver in response to the request at a second time, the measurement information including position measurement data and a corresponding measured time based on multiple satellite signals received by the GNSS receiver. The method further includes determining that the measured time is erroneous when the measured time is outside an accurate time range determined based on at least one of the first time and the second time, and identifying a substitute time and determining the position of the GNSS receiver based on the substitute time when the measured time is determined to be erroneous.

In another representative embodiment, a computer readable medium, storing code executable by a computer processor, is provided for determining a position of a GNSS receiver. The computer readable medium includes communication, time error determining and time recovery code segments, for example. The communication code segment sends a request for measurement information to the GNSS receiver at a first time and receives the measurement information from the GNSS receiver at a second time, the measurement information including position measurement data and a corresponding measured time based on multiple satellite signals received by the GNSS receiver. The time error determining code segment determines whether the measured time is erroneous, where the time error determining code segment determines that the measured time is erroneous when the measured time of the received measurement information is outside an accurate time range determined based on at least one of the first time and the second time. The time recovery code segment determines a recovered time using the measured time when the time error determining code segment determines that the measured time is not erroneous and using a substitute time when the time error determining code segment determines that the measured time is erroneous.

In yet another representative embodiment, a device includes a communication interface and a processor. The communication interface is configured to enable sending a request for measurement information to a GNSS receiver at a first time and to enable receiving the measurement information from the GNSS receiver at a second time, the measurement information including position measurement data and a corresponding measured time based on multiple satellite signals received by the GNSS receiver. The processor is configured to control operations of the communication interface and to execute an algorithm. The algorithm includes determining whether the measured time received through the communication interface is erroneous, where the measured time is erroneous when the measured time of the received measurement information is earlier than a lower limit of an accurate time range or later than an upper limit of the accurate time range; determining a recovered time using the measured time when the measured time is not erroneous and using a substitute time when the measured time is erroneous; and calculating a geographic location of the GNSS receiver using the recovered time.

BRIEF DESCRIPTION OF THE DRAWINGS

The illustrative embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

DETAILED DESCRIPTION

In the following detailed description, for purposes of explanation and not limitation, illustrative embodiments disclosing specific details are set forth in order to provide a thorough understanding of embodiments according to the present teachings. However, it will be apparent to one having had the benefit of the present disclosure that other embodiments according to the present teachings that depart from the specific details disclosed herein remain within the scope of the appended claims. Moreover, descriptions of well-known devices and methods may be omitted so as not to obscure the description of the example embodiments. Such methods and devices are within the scope of the present teachings.

In various embodiments, occurrences of bad or erroneous time measurements provided by a mobile device are detected. When the time measurements are erroneous or faulty, a location determination server substitutes another time for the erroneous measured time, and bases time recovery operations and position calculation on the substitute time. This results in increased position yield from A-GNSS where mobile devices do not provide accurate time measurements.

Figure 1:
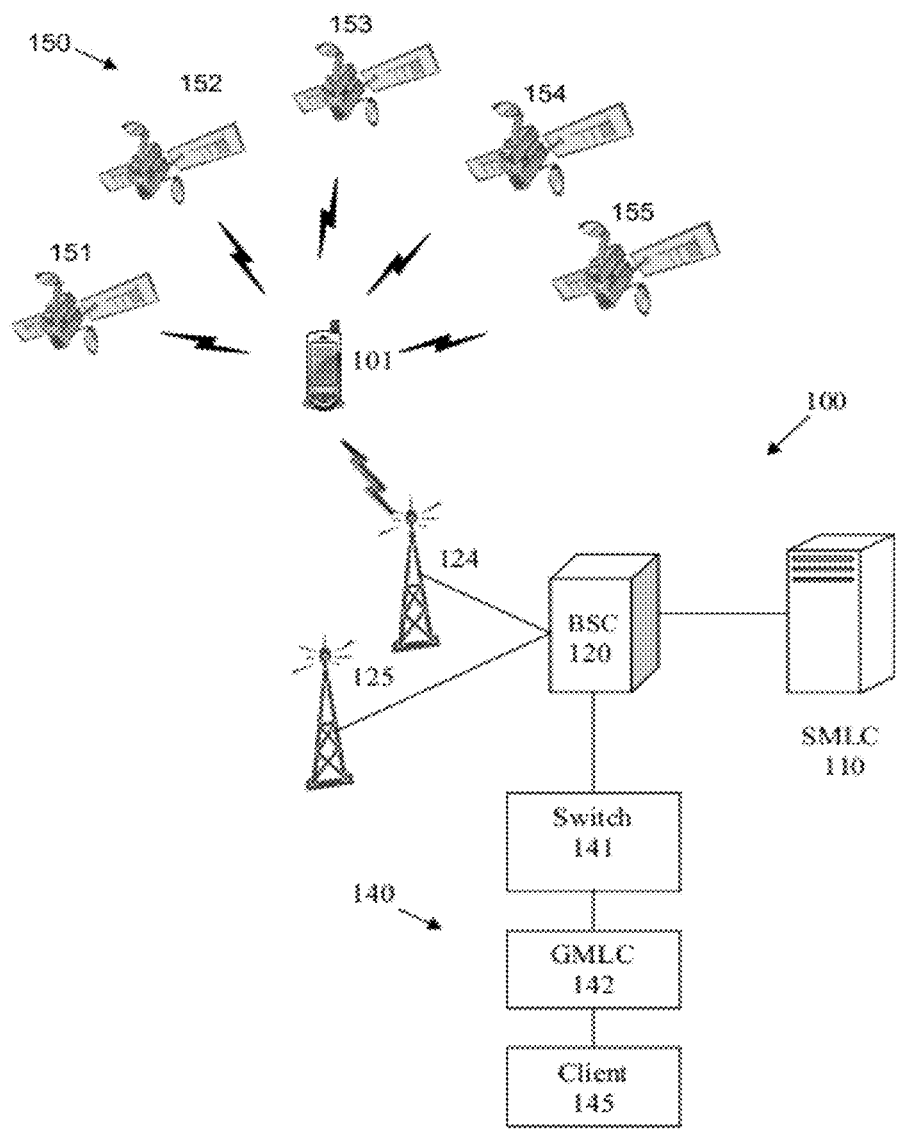
FIG. 1 is a functional block diagram illustrating a system for determining the position of a mobile device in a wireless communication network using recovered time, according to a representative embodiment.

FIG. 1 is a functional block diagram illustrating a system for locating a mobile device in a wireless communication network using recovered time, according to a representative embodiment.

Referring to FIG. 1, wireless communications network 100 includes SMLC 110 and base station controller (BSC) 120, which includes representative base stations 124 and 125 corresponding to cells. The SMLC 110 communicates with the BSC 120 and determines geographic locations of mobile devices, such as representative mobile device 101. The mobile device 101 may be any type of wireless device configured for communicating through the BSC 120, including cellular telephones, laptop computers, personal digital assistants (PDAs), gaming devices, or the like.

The mobile device 101 includes a GNSS receiver configured to communicate with a GNSS constellation 150, which includes multiple positioning satellites, indicated by representative GNSS satellites 151-155. Five satellites are illustrated for purposes of explanation, because this is the minimum number of satellites from which positioning/time measurements are required for the SMLC 110 to determine accurately the position of the mobile device 101 when the precise time is not known. The GNSS constellation 150 may include any type of satellite positioning system configured to provide geographic locations of GNSS receivers (e.g., of mobile devices) using a constellation of satellites, such as Global Positioning System (GPS), Global Navigation Satellite System (GLONASS), Galileo and COMPASS Navigation Satellite System (BeiDou), for example.

The SMLC 110 may be configured to implement any of various types of location determination services without departing from the scope of the present teachings. For example, the location determination service may use only a satellite positioning system, such as GNSS constellation 150. Alternatively, the location determination service may further include a terrestrial positioning system, together with the satellite positioning system, to determine the location of mobile device 101 based on a combination of satellite measurements and terrestrial measurements. Terrestrial positioning systems may be based on any type of range measurements, such as uplink-time difference of arrival (U-TDOA) or timing advance (TA) measurements (e.g., in a GSM network), round-trip time (RTT) measurements (e.g., in a UMTS network), enhanced observed time difference (E-OTD) measurements, angle of arrival (AoA) measurements, power of arrival (POA) measurements, WiFi measurements, DTV signals and the like.

In the depicted embodiment, the SMLC 110 includes a positioning determination capability using assisted GNSS (A-GNSS) techniques. A-GNSS helps a device equipped with a GNSS receiver, such as the mobile device 101, by providing assistance data that reduces the time it takes for the GNSS receiver to lock on to signals from the GNSS satellites 151-155. Generally, the mobile device 101 may scan a wide frequency range looking for signals transmitted from the GNSS satellites 151-155 in orbit. The satellite signals are generally weak, and are transmitted at different frequencies and code phases, so it may take a relatively long time for the mobile device 101 to lock on to a specific satellite signal. In addition, in order to calculate its location, the mobile device 101 must lock on to signals from multiple satellites, simultaneously.

Therefore, without A-GNSS, the mobile device 101 would take up to several minutes to lock onto the signals required for location determination.

For example, when GNSS assistance data is required, the SMLC 110 may first identify the cell in which the mobile device 101 is located, e.g., using a number or other identifier of the cell included in signals received from the mobile device 101. The SMLC 110 may then access a database (not shown) to determine the latitude, longitude, orientation, opening and/or range of the cell, which may be used as an initial location for calculating the GPS assistance data for the mobile device 101. For example, the SMLC 110 may calculate the GNSS assistance data using the latitude and longitude of the serving base station 124 and its coverage area as the approximate initial location of the mobile device 101. The GNSS assistance data may improve the time-to-first-fix (TTFF) and yield. For example, orbital modeling information of the GNSS assistance data provided by the SMLC 110 enables the mobile device 101 to avoid demodulating navigation messages broadcast from the GNSS satellites 151-155, thus improving TTFF. Also, the search space for locating each of the GNSS satellites 151-155 is narrowed, so that the mobile device 101 can detect weaker GPS signals, thus improving yield.

The BSC 120 is selectively connected to Gateway Mobile Location Center (GMLC) 142 in a corresponding core network 140 through switch 141. For example, the switch 141 may be a Mobile Switching Center (MSC) in a circuit switching network, or a serving GPRS support node (SGSN) in a packet switching network. The GMLC 142 is a platform for interfacing the client 145 with the BSC 120, e.g., to initiate location determination services with respect to the mobile device 101 and other mobile devices. The GMLC 142 may be connected to a home location register (HLR) (not shown) or other database that includes subscriber and routing information with respect to the mobile device 101.

As stated above, FIG. 1 depicts a device-assisted A-GNSS, in which the mobile device 101 measures satellite signals (often referred to as code-phases which can be converted to pseudo-ranges) from the GNSS satellites 151-155, and provides them to the SMLC 110 (e.g., via base station 124 and BSC 120). The SMLC 110 computes the location of the device, and may then return the computed location to the mobile device 101 or other client, such as client 145, requesting the position of the mobile device 101. The client 145 represents a service, application or subscriber, for example, wishing to use the network to carry out a position determination request for the mobile device 101.

Although the embodiment of FIG. 1 depicts a GSM network, including representative SMLC 110, BSC 120 and base stations 124 and 125, for example, it is understood that other types of networks and location determination servers may be incorporated without departing from the scope of the present teachings. For example, in a UMTS network, the functionality of the SMLC 110, discussed below, may be performed by stand-alone SMLC (SAS) and the BSC 120 may be a radio network controller (RNC) in a radio access network, in which case the base stations 124 and 125 would be Node Bs.

Figure 2:
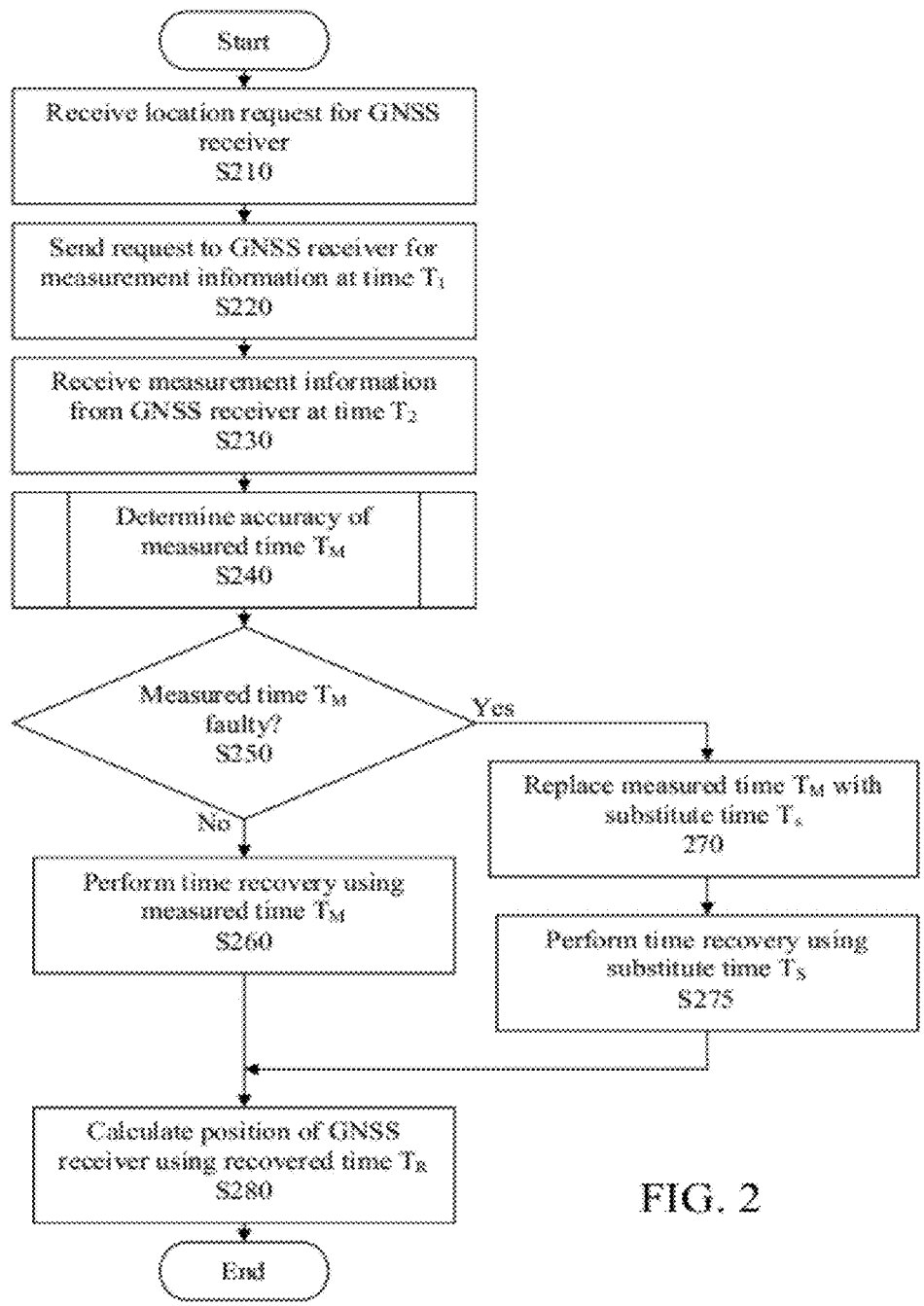
FIG. 2 is a flowchart illustrating a method for calculating the position of a mobile device using recovered time, according to a representative embodiment.

FIG. 2 is a flowchart illustrating a method for determining the position of a mobile device using recovered time, according to a representative embodiment. The process of FIG. 2 may be executed, for example, by the SMLC 110 depicted in FIG. 1, although the process may be executed by any other A-GNSS server or node having access to the BSC 120, or by the BSC 120 itself, without departing from the scope of the present teachings.

In block S210, an A-GNSS server (e.g., the SMLC 110) receives a location request with respect to a GNSS receiver (e.g., the mobile device 101). The location request may be initiated by any of a variety of sources, without departing from the scope of the present teachings. For example, referring to FIG. 1, the SMLC 110 may receive a message from the mobile device 101 through the base station 124 and the BSC 120 requesting determination of the geographic location of the mobile device 101. The message may be initially transmitted over voice/data communication channels and/or signaling channels, for example. Alternatively, the SMLC 110 may receive a location request from the client 145 through GMLC 142, the switch 141 and the BSC 120, requesting determination of the geographic location of the mobile device 101.

Regardless of the initiating source, the A-GNSS server sends a request for positioning measurement information to the GNSS receiver in block S220 at a first time $T_1$. The request may include assistance data for helping the GNSS receiver more quickly locate the GNSS satellites (e.g., the GNSS satellites 151-155), as discussed above.

The GNSS receiver processes the request by performing a position measurement routine, which includes locking on to and receiving signals from at least five GNSS satellites. The received signals may include navigation messages, for example, providing ephemeris data and timing signals, enabling the GNSS receiver to generate the measurement information. For example, the measurement information includes position measurement data and corresponding measured time $T_M$, indicating the time at which the GNSS measurement was made. The A-GNSS server receives the measurement information from the GNSS receiver in block S230 at a second time $T_2$. In an alternative embodiment, the second time T2 may be the time at which the GNSS receiver sends the measurement information.

Block S240 indicates a process by which the A-GNSS server determines the accuracy of the measured time $T_M$ included in the measurement information. Generally, the process indicated in block S240 determines that the received measured time $T_M$ is faulty when it is grossly inaccurate or otherwise too far removed from the actual time at which the measurement was made to allow a time recovery process, which estimates the actual measurement time for a position calculation, discussed below. Representative embodiments of the process indicated in block S240 are discussed below with reference to the flow chart depicted in FIG. 3 and the timing diagrams depicted in FIGS. 4A and 4B.

When the measured time $T_M$ is not faulty (block S250: No), a time recovery process is performed in block S260 using the measured time $T_M$ included in the measurement information received from the GNSS receiver. The time recovery process may include any compatible process for recovering time to a sufficient degree of confidence to perform position calculation of the GNSS receiver, as discussed below. Notably, time recovery is not necessarily required if the measurement is acceptable, depending system configuration. For example, block S260 may be executed when the system is configured to always perform the time recovery process, but block S260 may be skipped or optionally executed when the system is not configured to always perform the time recovery process.

When the measured time $T_M$ included in the measurement information is faulty (block S250: Yes), the measured time $T_M$ is replaced with a substitute time $T_S$ in block S270. The time recovery process is then performed in block S275 using the substitute time $T_S$ to obtain a recovered time $T_R$.

For example, in an embodiment, the substitute time $T_S$ is the second time $T_2$ at which the A-GNSS server receives the measurement information from the GNSS receiver in block S230. In another embodiment, the substitute time $T_S$ may be the second time $T_2$ less a small time value to account for the estimated time that it takes the GNSS receiver to collect measurements and/or to send the measurement information to the A-GNSS server. For example, the small time value may be the estimated propagation time for the measurement information to reach the A-GNSS server from the GNSS receiver. Also, the propagation time may be estimated based on the complete round trip time to the A-GNSS server and the GNSS receiver, which may be acquired in the normal course of communications between the A-GNSS server and the GNSS receiver (e.g., determined in part using timing advance (TA) measurements). TCP implementations, for example, maintain an estimate of the round trip time for buffering purposes. The round trip time may be halved to acquire the estimated propagation time to be used as the small time value. Of course, other embodiments may incorporate other times as the substitute time $T_S$, without departing from the scope of the present teachings.

In an embodiment, the process for determining the recovered time $T_R$ performed in block S260 (optionally) and block S275 may be the same process. The time recovery process may include any compatible process for recovering time to a sufficient degree of confidence to perform position calculation of the GNSS receiver (e.g., in block S280), such as integrated time recovery techniques or iterative time recovery techniques, as described for example by HARPER in "A Comparison of Iterative and Integrated Time Recovery Methods for Server Side Position Calculation," IGNSS Symposium (December 2007), GLENNON et al. in "Solution of Timing Errors in AGPS," Institute of Navigation (ION) GPS 2005 (September 2005), and SYRJARINNE in "Possibilities for GPS Time Recovery with GSM Network Assistance," ION GPS 2000 (September 2000), the respective subject matters of which are hereby incorporated by reference, although various other time recovery techniques may be used without departing from the scope of the present teachings.

For example, according to an iterative time recovery technique, as described by HARPER, a least squares (LS) position calculation is performed at discrete time intervals, and the result that minimizes the smallest sum of the squared residuals (SSR) is selected. The position calculation is the performed within a configured time window, determined based on maximum deviation from true time, where the configured time window is centered on the measured time $T_M$ (or the substitute time $T_S$ when the measured time $T_M$ is determined to be faulty). The weighted implementation solves Equation (1), as follows:

$$\hat{x} = ((A^T W A)^{-1} A^T W b) \quad (1)$$

In Equation (1), $\hat{x}$ contains the estimated location and error of the GNSS receiver, A is the geometric matrix, W is the weight matrix and b is the observation matrix. This position calculation is performed at different GNSS times within the configured time window relative to the measured time $T_M$ (or the substitute time $T_S$). Minimizing the SSR for each measurement optimizes the result.

According to an integrated time recovery technique, as described by HARPER, an additional term is added to the LS solution of the iterative recovery technique discussed above. In order to solve for the additional unknown, at least five GNSS measurements are required, as opposed to the four GNSS measurements required when time is well known. The intent is to solve for the x, y and z coordinates of the GNSS receiver in earth-centered earth-fixed (ECEF) reference frame, receiver clock error, and gross time recovery error. The gross time recovery error, in particular, may be in the range of seconds. The A matrix from Equation (1) is modified to include the additional term in order to also solve for the gross time recovery error. The A matrix is also modified, such that row i of the A matrix is provided by Equation (2), as follows:

$$A_i = \left(-\frac{(x_s - x_u)}{r_s} - \frac{(y_s - y_u)}{r_s} - \frac{(z_s - z_u)}{r_s} - 1 \dot{R}\right) \quad (2)$$

In Equation (2), $\dot{R}$ is the range rate, $(x_u, y_u, z_u)$ are the coordinates of the GNSS receiver (e.g., mobile device 101) in ECEF reference frame, $(x_s, y_s, z_s)$ are the coordinates of the $i^{th}$ satellite (e.g., GNSS satellite 151) in ECEF reference frame, and $r_s$ is the range from the GNSS receiver to the $i^{th}$ satellite. In addition, the range $r_s$ and the range rate $\dot{R}$ may be respectively calculated by Equations (3) and (4), below:

$$r_s = \sqrt{(x_s - x_u)^2 + (y_s - y_u)^2 + (z_s - z_u)^2} \quad (3)$$

$$\dot{R} = (v_s - v_u) \cdot \frac{s - u}{r} + f + \varepsilon \quad (4)$$

In Equations (3), $(x_u, y_u, z_u)$ are the coordinates of the current estimate of the location of the mobile device. Also, in Equation (4), $v_s$, and $v_u$ are the three dimensional velocities of the $i^{th}$ satellite (e.g., GNSS satellite 151) and the mobile device (e.g., mobile device 101) respectively, s and u are the ECEF coordinates of the $i^{th}$ satellite and the mobile device, respectively, r is the range from the GNSS receiver to the $i^{th}$ satellite (as discussed above), f is the GNSS receiver clock drift in m/s, and $\varepsilon$ is the error. The range rate $\dot{R}$ is the rate of change of the range r between the user and the satellite. Since the time recovery error of the original measurement can be large, the location of the GNSS satellites must be recalculated each time through the LS loop.

Referring again to FIG. 2, the A-GNSS server calculates the geographic position of the GNSS receiver in block S280 using the recovered time $T_R$ provided by the time recovery process performed in either block S260 or block S275. In the depicted embodiment, the A-GNSS server performs the time recovery operation to obtain the recovered time $T_R$, and calculates the geographic position of the GNSS receive using the recovered time $T_R$, even when it is determined in blocks S240 and S250 that the measured time $T_M$ provided by the GNSS receiver is generally accurate (i.e., it falls within an accurate time range or range of acceptable times, discussed below). Use of the recovered time $T_R$ accounts for timing error that may otherwise be introduced by the process, and requires measurements from five satellites (as opposed to four satellites) in order to calculate the geographic position.

In an alternative embodiment, the A-GNSS server may skip the time recovery operation when it is determined in blocks S240 and S250 that the measured time $T_M$ provided by the GNSS receiver is generally accurate. In this case, measurements are required from only four satellites in order to calculate the geographic position of the GNSS receiver.

Figure 3:
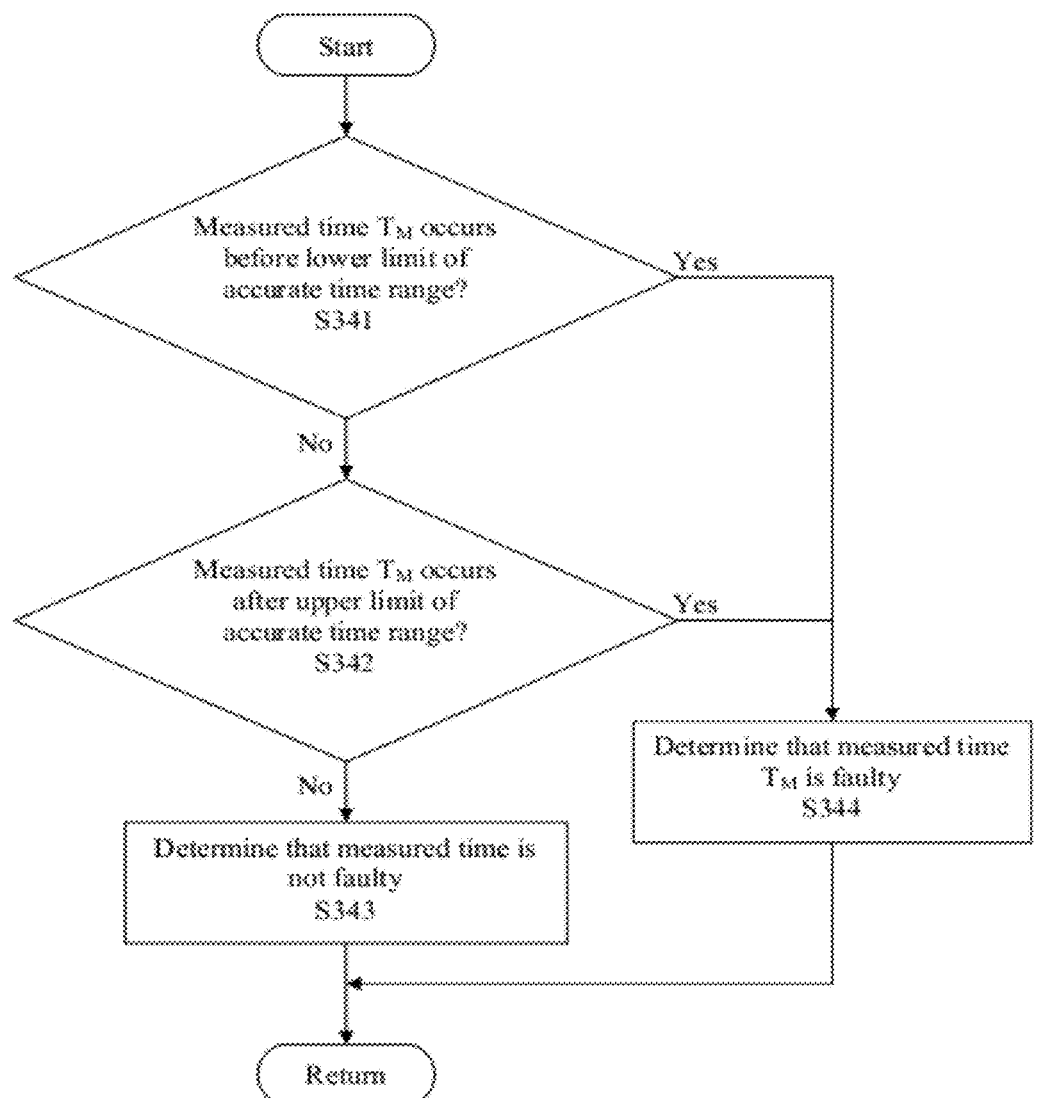
FIG. 3 is a flowchart illustrating a process for determining accuracy of measured time, included in the method illustrated in FIG. 2, according to a representative embodiment.
Figure 4A:
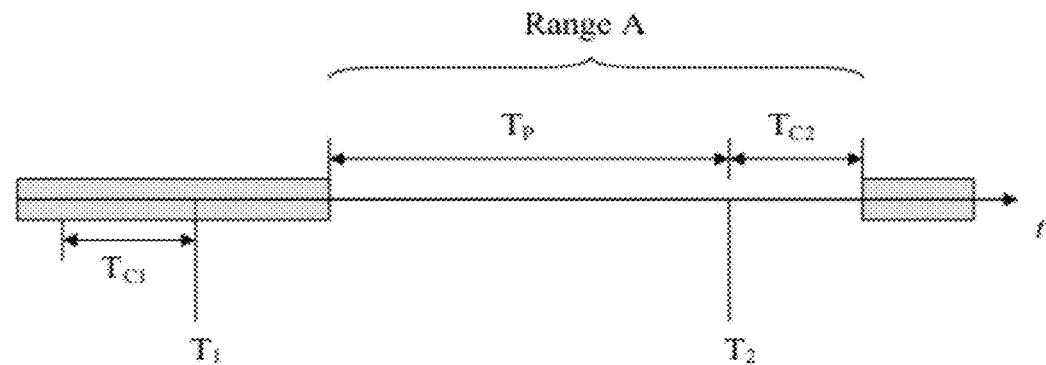
FIGS. 4A and 4B are timing diagrams showing examples of accurate time ranges, according to representative embodiments.
Figure 4B:
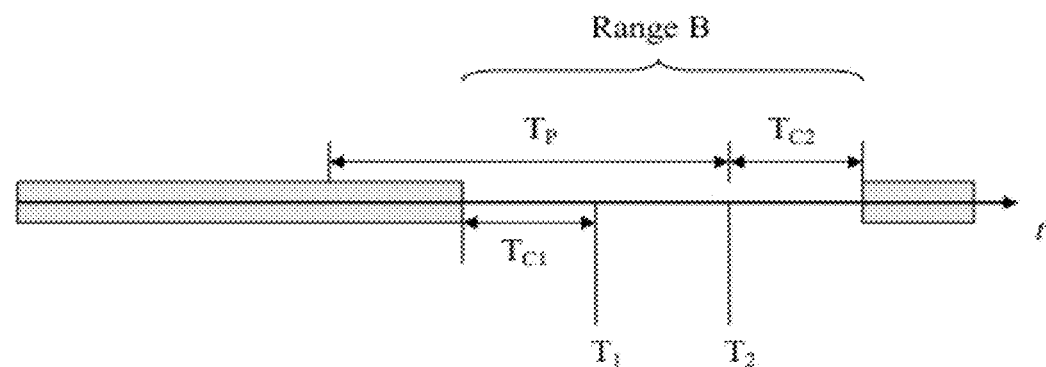

FIG. 3 is a flowchart illustrating a process for determining accuracy of measured time $T_M$, indicated by block S240 in FIG. 2, according to a representative embodiment. FIGS. 4A and 4B are timing diagrams showing examples of accurate time ranges, in which the measured time $T_M$ is considered to be not faulty, according to representative embodiments.

Generally, in order to determine the accuracy of the measured time $T_M$, the A-GNSS server determines whether the measured time $T_M$ is within a time window or accurate time range, e.g., which is close enough to the actual measured time to enable the time recovery process to be performed successfully. For example, the time recovery process (e.g., in block S260) may require the measured time $T_M$ to be accurate within about 2-3 seconds of the actual measurement time in order to provide a usable recovered time $T_R$ for use in calculating the position of the GNSS receiver (e.g., in block S280).

Referring FIG. 3, the A-GNSS server determines in block S341 whether the measured time $T_M$ occurs before the lower limit of the accurate time range. When the measured time $T_M$ occurs before the lower limit of the accurate time range (block S341: Yes), the measured time $T_M$ is determined to be faulty in block S344, in which case the measured time $T_M$ cannot be used to perform a time recovery operation. When the measured time $T_M$ does not occur before the lower limit of the accurate time range (block S341: No), the process proceeds to block S342, where it is determined whether the measured time $T_M$ occurs after the upper limit of the accurate time range. When the measured time $T_M$ occurs after the upper limit of the accurate time range (block S342: Yes), the measured time $T_M$ is determined to be faulty in block S344, in which case the measured time $T_M$ cannot be used to perform a time recovery operation. When the measured time $T_M$ does not occur after the upper limit of the accurate time range (block S342: No), the measured time $T_M$ is determined to be not faulty in block S343, in which case the measured time $T_M$ can be used to perform a time recovery operation. In other words, the measured time $T_M$ is determined to be within the accurate time range and thus acceptable to the time recovery operation. Of course, alternative methods for determining whether the measured time $T_M$ is within the accurate time range may be incorporated without departing from the scope of the present teachings.

In various embodiments, the accurate time range may be defined in accordance with various criteria. Generally, the lower and upper limits of the accurate time range may be derived from the first time $T_1$, which is the time the request for measurement information was sent to the GNSS receiver in block S220 of FIG. 2, and/or the second time $T_2$, which is the time the measurement information is received by the A-GNSS sever at block S230 of FIG. 2. In an alternative embodiment, the second time T2 may be the time at which the GNSS receiver sends the measurement information (as opposed to the time the A-GNSS sever receives the measurement information).

For example, in a representative embodiment, the accurate time range is simply defined by the first time T1 as the lower limit and the second time $T_2$ as the upper limit. Thus, any measured time $T_M$ falling between the first and second times $T_1$ and $T_2$ would be considered acceptable for purposes of the time recovery process. However, other accurate time ranges may be incorporated without departing from the scope of the present teachings. For example, FIGS. 4A and 4B depict accurate time ranges Range A and Range B, respectively, which account for clock delays and/or propagation time for measurement information to be transmitted from the GNSS receiver to the A-GNSS server.

Referring to FIG. 4A, the lower limit of the accurate time range Range A is defined by the estimated propagation time $T_P$ prior to the second time $T_2$ at which the measurement information is received by the A-GNSS sever. The upper limit of the accurate time range Range A is defined by the second time $T_2$ and a predetermined clock error allowance $T_{C2}$, which is an allowance for clock errors at the A-GNSS server, for example. The measured time $T_M$ is therefore determined to be faulty when it is either earlier than the second time $T_2$ less the estimated propagation time $T_P$ or later than the second time $T_2$ plus the predetermined clock error allowance $T_{C2}$ (collectively indicated by hatched portions of FIG. 4A).

Similarly, referring to FIG. 4B, the lower limit of the accurate time range Range B is defined by the first time $T_1$ and a predetermined clock error allowance $T_{C1}$, which is an allowance for clock errors at the GNSS receiver, for example, and may be substantially the same as the predetermined clock error allowance $T_{C2}$. The upper limit of the accurate time range Range B is defined by the second time $T_2$ and the predetermined clock error allowance $T_{C2}$. The measured time $T_M$ is therefore determined to be faulty when it is either earlier than the first time $T_1$ minus the predetermined clock error allowance $T_{C1}$ or later than the second time $T_2$ plus the predetermined clock error allowance $T_{C2}$ (collectively indicated by hatched portions of FIG. 4B).

In addition, various embodiments may include the A-GNSS server being configured with a predetermined tolerance range, in which case an additional margin may be included with respect to one or both ends of the accurate time range. For example, depending on clock accuracy, the additional margin may be as little as 10 ms for very accurate clocks, and as high as large as 1 second for loosely synchronized clocks. Notably, any additional margin allowed for error tolerance must have a similar compensation in the corresponding time recovery algorithm, discussed above. For example, if an extra 0.5 second is provided as the additional margin of the accurate time range, the window used in a subsequent iterative time recovery process (e.g., as shown in blocks S260, S275) will be 0.5 second larger, as well.

As another example, the GNSS receiver may be configured to allow for on-board GNNS measurement caching. That is, in response to a request for measurement information sent by the A-GNSS server in block S220, the GNSS receiver may provide recently cached measurement information or calculate measurement information based on recently cached measurements from a previously executed position measurement. The GNSS receiver is thus able to avoid the overhead required to take additional measurements and to calculate new measurement information to send to the A-GNSS server. Also, the turn-around time between the A-GNSS server sending the request to the GNSS receiver in block S220 and receiving the measurement information from the GNSS receive in block S230 is shorter.

In order to enable use of cached measurement information (and/or cached measurements), an additional margin may be subtracted from the first time $T_1$ at which the request for measurement information is sent to the GNSS receiver, reducing the lower limit and thus increasing the accurate time range. Generally, this accounts for the time that it takes for the measurement information to get from GNSS receiver to the A-GNSS server, plus allowance for caching. As discussed above, any additional margin must have a similar compensation in the corresponding time recovery algorithm. Alternatively, the additional margin for caching may be subtracted from both the first time $T_1$ at which the request for measurement information is sent to the GNSS receiver and the second time $T_2$ at which the measurement information is received by the A-GNSS server, so that the overall size of the accurate time range remains the same, and simply shifts to earlier times.

Also, as discussed above with reference to FIG. 4A, the second time $T_2$ at which the measurement information is received by the A-GNSS sever at block S230 of FIG. 2 may be used as the only basis for the accurate time range. That is, the second time $T_2$ may set the latest possible time for the range of acceptable times, possibly with a small tolerance, e.g., depending on the clock accuracy of the A-GNSS server. The earliest time possible time for the accurate time range may be the second time $T_2$ less a predetermined interval. In various embodiments, the predetermined interval may be determined, for example, adding one or more of a clock accuracy tolerance, a network transmission time, a measurement acquisition time and a measurement caching allowance, as discussed above. Similarly, in alternative embodiments, time at which the measurement information is sent by the GNSS receiver may be used as the only basis for the accurate time range.

Figure 5:
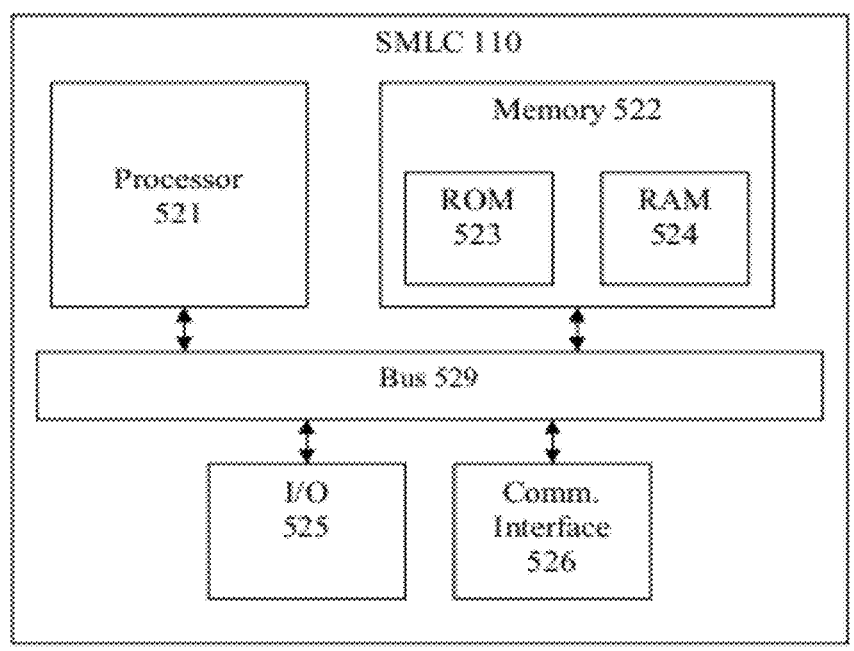
FIG. 5 is a functional block diagram illustrating a processing device for determining the position of a mobile device using recovered time, according to a representative embodiment.

FIG. 5 is a functional block diagram illustrating SMLC 110 that executes an algorithm and/or process for calculating the position of a mobile device using recovered time, according to a representative embodiment. Although the SMLC 110 is shown and discussed below, it is understood that other servers, computers or nodes in the wireless communications network 100 of FIG. 1 may be configured in a similar manner as the SMLC 110, at least with respect to processing and storage functionality.

The various "parts" shown in the SMLC 110 may be physically implemented using a software-controlled controller or microprocessor, e.g., processor 521, hard-wired logic circuits, firmware, or a combination thereof. Also, while the parts are functionally segregated in the SMLC 110 for explanation purposes, they may be combined variously in any physical implementation.

In the depicted embodiment, the SMLC 110 includes processor 521, memory 522, bus 529 and various interfaces 525-526. The processor 521 is configured to execute one or more logical or mathematical algorithms, including the time accuracy, time recovery and position calculation processes of the embodiments described herein, in conjunction with the memory 522, as well as basic functionality for executing and/or controlling geographic location determination processes for locating mobile devices. The processor 521 may be constructed of any combination of hardware, firmware or software architectures, and include its own memory (e.g., nonvolatile memory) for storing executable software/firmware executable code that allows it to perform the various functions. Alternatively, the executable code may be stored in designated memory locations within memory 522, discussed below. In an embodiment, the processor 521 may be a central processing unit (CPU), for example, and may execute an operating system, such as Windows® operating systems available from Microsoft Corporation or Unix operating systems (e.g., Solaris™ available from Sun Microsystems, Inc.), and the like. The operating system may control execution of other programs of the SMLC 110.

The memory 522 may be any number, type and combination of external and internal nonvolatile read only memory (ROM) 523 and volatile random access memory (RAM) 524, and stores various types of information, such as signals and/or computer programs and software algorithms executable by the processor 521 (and/or other components), e.g., to perform time accuracy determinations, time recovery processes and position calculations, according to representative embodiments described herein, as well as other basic functionality of geographic location determination of mobile devices. As generally indicated by ROM 523 and RAM 524, the memory 522 may include any number, type and combination of tangible computer readable storage media, such as a disk drive, an electrically programmable read-only memory (EPROM), an electrically erasable and programmable read only memory (EEPROM), a CD, a DVD, a universal serial bus (USB) drive, and the like.

In addition, the SMLC 110 includes one or more communication interfaces, indicated by representative communications interface 526, to enable communications with one or more components of the wireless communications network 100. For example, the communications interface 526 enables communications with mobile devices or other GNNC receivers, such as mobile device 101, through base stations, such as base stations 124 and 125. The communications include sending requests for positioning measurement information and receiving the positioning measurement information in response. In addition, the communications interface 526 also enables communicates with various sources, such as the client 145, through the GMLC 142, the switch 141 and the BSC 120. The communications may be provided to the processor 521 and/or the memory 522 via bus 529, e.g., via bus 529. In various embodiments, the communication interface 526 includes one or more types of interfaces, such as a wired or wireless Ethernet, ATM, or MTP, for example. However, the number, types and arrangement of interfaces may vary without departing from the scope of the present teachings.

A user and/or other computers may interact with the SMLC 110 using various input device(s) through I/O interface 525. The input devices may include a keyboard, key pad, a track ball, a mouse, a touch pad or touch-sensitive display, and the like. Also, various information may be displayed on a display (not shown) through a display interface (not shown), which may include any type of graphical user interface (GUI).

In various embodiments, the process steps depicted FIGS. 2 and 3 may be incorporated within one or more processing modules of a device, such as the SMLC 110 depicted in FIGS. 1 and 5. However, the modules may be executable by any other A-GNSS server, computer or node having access to the BSC 120, or by the BSC 120 itself, without departing from the scope of the present teachings. The modules may be implemented as any combination of software, hard-wired logic circuits and/or firmware configured to perform the designated operations. Software modules, in particular, may include source code written in any of a variety of computing languages, such as C++, C# or Java, and are stored on tangible computer readable storage media, such the computer readable storage media discussed above with respect to memory 522, for example.

The identity and functionality of the modules may vary, without departing from the scope of the present teachings. For example, referring to FIG. 2, blocks S210-S230 may be incorporated within a communication module, blocks S240-S250 may be incorporated within a faulty measured time $T_M$ determination module, blocks S260-S275 may be incorporated within a time recovery module, and block S280 may be incorporated within a positioning determination module. Of course, the number and/or identities of the modules, as well as the combinations of steps included in each, may vary without departing from the scope of the present teachings.

While specific embodiments are disclosed herein, many variations are possible, which remain within the concept and scope of the invention. Such variations would become clear after inspection of the specification, drawings and claims herein. The invention therefore is not to be restricted except within the scope of the appended claims.

What is claimed is:

1. A method implemented by an assisted Global Navigation Satellite System (GNSS) server for determining a position of a GNSS receiver, the method comprising:
   sending a request for measurement information to the GNSS receiver at a first time;
   receiving the measurement information from the GNSS receiver in response to the request at a second time, the measurement information including position measurement data and a corresponding measured time based on a plurality of satellite signals received by the GNSS receiver;
determining that the measured time is erroneous when the measured time is outside an accurate time range determined based on at least one of the first time and the second time; and
identifying a substitute time and determining the position of the GNSS receiver based on the substitute time when the measured time is determined to be erroneous.

2. The method of claim 1, further comprising:
determining the position of the GNSS receiver based on the measured time when the measured time is not determined to be erroneous.

3. The method of claim 1, wherein determining that the measured time is erroneous comprises determining that the measured time is later than the second time by a predetermined amount.

4. The method of claim 3, wherein the predetermined amount is determined based on an estimate of a clock error at the GNSS server.

5. The method of claim 1, wherein determining that the measured time is erroneous comprises determining that the time is earlier than the first time by a predetermined amount.

6. The method of claim 5, wherein the predetermined amount is determined based on an estimate of a clock error at the GNSS receiver.

7. The method of claim 1, wherein determining that the measured time is erroneous comprises determining that the time is earlier than the second time by a predetermined amount.

8. The method of claim 7, wherein the predetermined amount is an approximate time required for the GNSS receiver to collect and send the measurement information.

9. The method of claim 8, wherein the approximate time is determined based on time taken for a message to be sent to the GNSS receiver and a response to be received.

10. The method of claim 1, wherein determining the position of the GNSS receiver using the substitute time comprises:
performing time recovery to obtain a recovered time using the substitute time; and
calculating the position of the GNSS receiver using the recovered time.

11. The method of claim 10, wherein performing time recovery comprises:
performing an iterative time recovery method.

12. The method of claim 10, wherein performing time recovery comprises:
performing an integrated time recovery method.

13. The method of claim 1, wherein the substitute time is the second time less a predetermined time interval which approximates an amount of time required for the GNSS receiver to generate and send the measurement information in response to the request for measurement information.

14. The method of claim 1, wherein the substitute time is the second time less an estimated propagation time for the measurement information sent by the GNSS receiver to be received by the GNSS server.

15. The method of claim 1, wherein the request for measurement information includes assistance data for assisting the GNSS receiver in locating at least one GNSS satellite of the GNSS satellites providing the plurality of satellite signals.

16. A non-transitory computer readable medium storing code executable by a computer processor for determining a position of a Global Navigation Satellite System (GNSS) receiver, the computer readable medium comprising:
a communication code segment for sending a request for measurement information to the GNSS receiver at a first time and for receiving the measurement information from the GNSS receiver at a second time, the measurement information including position measurement data and a corresponding measured time based on a plurality of satellite signals received by the GNSS receiver;
a time error determining code segment for determining whether the measured time is erroneous, wherein the time error determining code segment determines that the measured time is erroneous when the measured time of the received measurement information is outside an accurate time range determined based on at least one of the first time and the second time; and
a time recovery code segment for determining a recovered time using the measured time when the time error determining code segment determines that the measured time is not erroneous and using a substitute time when the time error determining code segment determines that the measured time is erroneous.

17. The computer readable medium of claim 16, further comprising:
a positioning determination code segment for calculating the position of the GNSS receiver using the recovered time.

18. The computer readable medium of claim 17, wherein the substitute time is the second time.

19. The computer readable medium of claim 17, wherein the substitute time is the second time less a predetermined time interval which approximates an amount of time required for the GNSS receiver to generate and send the measurement information in response to the request for measurement information.

20. A device, comprising:
a communication interface configured to enable sending a request for measurement information to a Global Navigation Satellite System (GNSS) receiver at a first time and to enable receiving the measurement information from the GNSS receiver at a second time, the measurement information including position measurement data and a corresponding measured time based on a plurality of satellite signals received by the GNSS receiver; and
a processor configured to control operations of the communication interface and to execute an algorithm comprising:
determining whether the measured time received through the communication interface is erroneous, wherein the measured time is erroneous when the measured time of the received measurement information is earlier than a lower limit of an accurate time range or later than an upper limit of the accurate time range;
determining a recovered time using the measured time when the measured time is not erroneous and using a substitute time when the measured time is erroneous; and
calculating a geographic location of the GNSS receiver using the recovered time.

* * * * *